H. H. Low,

Sawing Shingles.

No. 2,535. Reissued Apr. 2, 1867.

AM. PHOTO-LITHO. CO. N.Y. (OSBORNE'S PROCESS.)

United States Patent Office.

CHARLES S. BURT, OF DUNLEITH, ILLINOIS, ASSIGNEE, BY MESNE ASSIGNMENTS, OF H. H. LOW.

*Letters Patent No.* 19,644, *dated March* 16, 1858; *reissue No.* 2,184, *dated March* 6, 1866; *reissue, No.* 2,535, *dated April* 2, 1867.

IMPROVEMENT IN SHINGLE MACHINES.

The Schedule referred to in these Letters Patent and making part of the same.

TO ALL WHOM IT MAY CONCERN:

Be it known that H. H. Low, formerly of Galena, Jo Daviess county, and State of Illinois, but now deceased, did invent in his lifetime a new and improved Sawing Machine, for which Letters Patent, No. 19,644, were granted to him March 16, 1858; and afterwards, to wit, on the 6th day of March, 1866, the said patent was reissued to CHARLES S. BURT, the assignee in full of the said invention and patent. Now I, the said CHARLES S. BURT, of Dunleith, in the said county of Jo Daviess, on my application for a second reissue of said patent, do hereby declare the following to be a full, clear, and exact description of the said invention, which will be more fully understood by reference to the accompanying drawings, which make a part of this specification, and in which—

The object of this invention is to employ a vertically adjustable bolt-frame or table, A, which is sustained by a counter-weight so that it can readily be moved up or down alongside of a circular saw, and to provide such a frame with an adjustable head-block which can be moved up to or from the saw at pleasure, for the purpose of sawing straight slabs or tapering shingles from bolts, as will be hereinafter described; it being a leading purpose of the invention that the bolt and the saw should be placed and kept in such relation to each other that the saw should strike the bolt upon its side and nearly midway of its length, and that the middle of the bolt and the centre of the saw should be made to approach each other in order that the saw should cut as far as practicable lengthwise of the grain. The invention also provides for counterbalancing the bolt-frame in such a manner that after it has been depressed and a slab or shingle cut from the bolt, this frame will, on being released by the attendant, arise automatically to a position which will admit of the bolt being adjusted for another cut, as will be hereinafter described.

To enable others skilled in the art to understand this invention, I will describe its construction and operation.

Figure 2:
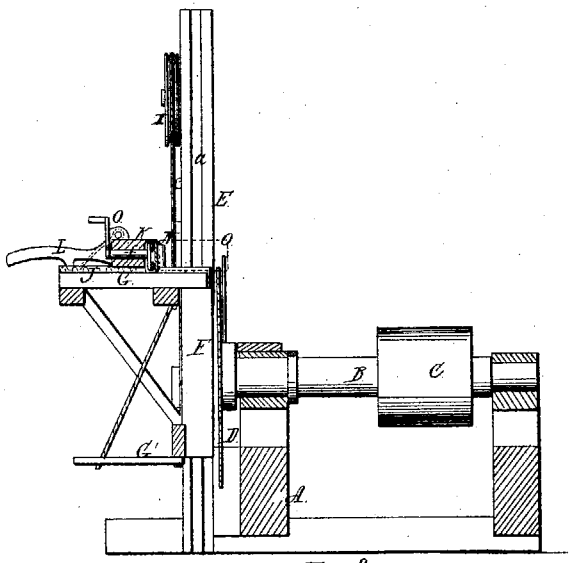
Figure 2 is a transverse section made by a vertical plane through the centre of the machine.
Figure 4:
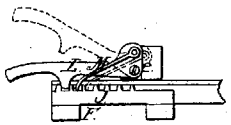
Figure 4 is a detached end view of the bolt-table and head-block.
Figure 1:
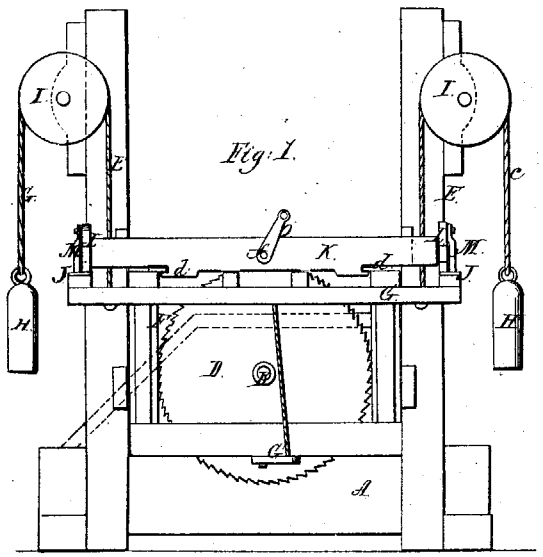
Figure 1 is a front elevation of the machine complete.
Figure 3:
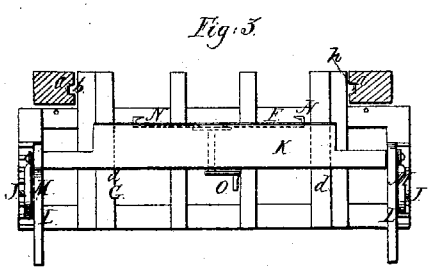
Figure 3 is a detached plan view of the bolt-table and head-block.

In the accompanying drawings, A represents a frame, which may be constructed in any suitable manner, and B represents an arbor or shaft, which is arranged horizontally upon said frame so as to turn freely in suitable bearings thereon. On the arbor B a belt drum, C, is keyed for receiving motion from any convenient motor. There is also attached to one end of the arbor a circular saw, D, as shown in figs. 1 and 2. To the end of the arbor frame A, and nearly in the same vertical plane as the saw D, there are two stationary uprights, E E, which are located at the sides of said frame. These uprights are grooved vertically on their inner sides, as shown at *a*, and a frame or gate, F, is fitted between the said uprights, which has tenon guides, *b b*, at its ends, which fit into the grooves *a a*, and slide freely therein when the gate is moved up and down. To the upper part of the gate F a horizontal frame, G, is secured for supporting an adjustable head-block, K. The gate and frame are counterbalanced by weights, H H, which are attached to cords or chains, *c c*, that pass over pulleys, I I, which are pivoted to the uprights E E, near the upper side thereof. The cords or chains *c c* are carried down from said pulleys and connected to the bolt-frame or gate F, as shown at fig. 1. To the lower part of the gate F a treadle, G′, is suitably attached, by means of which the attendant can with his foot depress the gate F. J J are two racks, which are secured to the upper surface of the frame G, one rack at each end thereof. K is a head-block, which is placed longitudinally on the frame G, and fitted to and allowed to slide between transverse guides or ways, *d d*, on the frame, as shown clearly in fig. 1. To each end of the head-block K a lever, L, is pivoted, and to each lever, near its pivot *e*, a pawl, M, is attached, said pawls catching into the racks J J, as shown in figs. 1, 2, and 4. To the inner side of the head-block K two dogs, N N, are attached, which are connected to a shaft, *f*, that passes transversely through the head-block, and has a lever, O, attached to its outer end.

The operation is as follows: The bolt shown in red, fig. 2, is secured to the head-block K by the clamping dogs N N, and the weights H H are sufficiently heavy to keep the frame G elevated and the bolt above the saw when the foot of the operator is not on the treadle D, or other equivalent means. The operator, by depressing the treadle G′ with his foot or by his hand, forces down the gate F and frame G and the bolt is thereby fed down to the saw D, which is rotated as before mentioned. When the saw has cut off a slab from the bolt, the operator removes his foot from the treadle, and the weights H H raise the frame G so that the bolt will be returned to the position above the saw. When the frame G reaches its highest point, it is stopped by projections on the uprights E E, or sills of frame, and the bolt can be adjusted by operating the levers L L. If both of these levers are operated simultaneously, the head-block K, with its bolt, will be moved bodily toward the saw, and the stuff will be sawed from the bolt with parallel sides. In case shingles or other stuff having tapering sides are to be sawed, each lever, L, is operated alternately after the frame G has ascended to a position which will clear the bolt above the highest part of the saw, so that the bolt will thus be presented obliquely to the saw. If desirable the bolt-frame may be arranged beneath the saw instead of above it, as shown, so that the bolts will be cut by the saw as the frame G rises. Such an arrangement would not change in the least the principle of this invention, provided the feature of hanging and balancing said frame herein described is preserved. The device for clamping the bolt to the head-block, and the contrivances for adjusting the head-block up to and from the saw, may be supplied by any of the well-known contrivances used for a similar purpose in sawing machinery. It is not, therefore, intended to confine this invention to such devices as are above shown.

One great advantage of this invention over machines which have hitherto been employed for sawing slabs is that when the bolt-table is released by the operator, it will be moved quickly to a position above the saw, which will admit of the adjustment of the bolt for another cut; and while this is the case the elevation of said table is effected without the expenditure of power on the part of the attendant by the counterbalancing weights.

I do not intend to limit myself to the specific devices above described in carrying my invention into use, but to embrace all equivalent means of producing the like results, and all such as operate upon the same principle.

I am aware of the patent of George Craine, dated September 23, 1856, and also of the patent of J. Creager, dated April 14, 1857, for sawing machines, and therefore I do not claim a horizontally moving carriage mounted upon horizontal rails and acted upon by weights, nor a stationary bed in combination with a circular saw, which rises and falls, being acted upon by weights or levers. Both these machines saw the shingle in one respect substantially like mine. The saw in each case strikes the bolt upon its side nearly midway between the ends, and passes through it in such a way as to saw it lengthwise of the grain as nearly as practicable, which is a matter of great importance. But my machine is a great improvement over both of those just named, as it is much more convenient to work a machine when the bolt moves vertically than when it moves horizontally, like that of Craine, and it is much more economical and advantageous to have the machine so arranged that the bolt shall move vertically, while the saw runs on fixed bearings, than to leave the bolt stationary while the saw works vertically up and down like that of Creager. It is difficult in this latter case to keep the band on the pulley, which is constantly changing its position, and, moreover, the weight to be moved is much greater than when the bolt is moved instead of the saw and its accompaniments. Besides, with a movable saw-frame there is danger of throwing the blocks from the dogs, owing to the saw sawing from the top of the bolt, and, also, the machine can be more substantially built, and operated to do a better quality and a greater quantity of work with less power and greater convenience when arranged as now proposed.

I am also aware that in 1829 Simeon Wood obtained a patent for a shingle machine having two bolt frames so placed as to counterbalance each other in a great degree, and in that respect having a slight resemblance to the subject-matter of my patent. But in that case the saw is made to take in at one corner of the bolt and to pass through it from end to end, cutting across the grain so that the surface of the shingle is roughened in the same manner as though it had been made in an ordinary saw-mill in which a circular saw is used.

This is not the invention I seek to patent, and I lay no claim to it. Nor do I claim separately any of the parts above described, in and of themselves; but what I do claim as new, and desire to secure by Letters Patent, is—

1. A vertically movable counterbalance bolt-gate, in combination with a circular saw, D, when so arranged and operating that while the saw is stationary, the bolt shall be fed up to it in the manner and for the purpose above described.

2. The combination of a vertically moving and counterbalanced bolt-frame G, and a head-block, K, substantially as and for the purpose hereinbefore described.

3. Providing a vertically moving bolt-frame, G, head-block K, and contrivances for moving said block up to or away from the saw, when arranged and constructed substantially as described.

4. So constructing a machine for sawing straight or tapering slabs from bolts with a circular saw, that the table or frame on which the bolts are secured shall be returned by a movement upward or downwards, as the case may be, to a position which will admit of the adjustment of the bolt after each cut, substantially as and for the purpose above set forth.

5. The combination of the vertically movable counterbalance gate and treadle with the head-block K, lever L, pawls M, and racks J, arranged and operating substantially as described.

Signed in presence of two subscribing witnesses.

CHARLES S. BURT.

Witnesses:

JOHN D. CLISE,

CHAS. A. BECK.